United States Patent [19]
Andersson

[11] 3,736,795
[45] June 5, 1973

[54] TUBULAR TRANSDUCER WITH STRAIN GAUGES AND SENSITIVE TO A FORCE TRANSMITTED TO ITS END SURFACES VIA LOAD SURFACES

[75] Inventor: John-Erik Andersson, Karlskoga, Sweden

[73] Assignee: Aktiebolaget Bofors, Bofors, Sweden

[22] Filed: May 20, 1971

[21] Appl. No.: 145,409

[30] Foreign Application Priority Data

June 1, 1970 Sweden .............................. 7552/70

[52] U.S. Cl. .................................. 73/141 A, 338/5
[51] Int. Cl. ............................................. G01l 1/22
[58] Field of Search ........................... 73/140, 141 A; 338/2, 5

[56] References Cited

UNITED STATES PATENTS

| | | |
|---|---|---|
| 3,513,431 | 5/1970 | Kovacs .................................. 338/5 |
| 3,205,706 | 9/1965 | Tracy .................................. 73/141 A |
| 3,376,537 | 4/1968 | Pugnaire ......................... 73/141 A X |
| 3,004,231 | 10/1961 | Laimins .................................... 338/5 |
| 3,100,990 | 8/1963 | Dimeff ................................. 73/147 |
| 3,217,536 | 11/1965 | Motsinger et al. ............... 73/141 A X |
| 3,422,671 | 1/1969 | Elengo, Jr. ........................... 73/141 A |

Primary Examiner—Charles A. Ruehl
Attorney—Hane, Baxley & Spiecens

[57] ABSTRACT

A tubular transducer for measuring compressive forces applied to the end thereof is provided with a plurality of axially and azimuthally displaced slots which make angles with the axis of the transducer to provide intermediate regions in the surface of the transducer that are joined by bridging regions which support strain gauges.

9 Claims, 9 Drawing Figures

FIG. 6
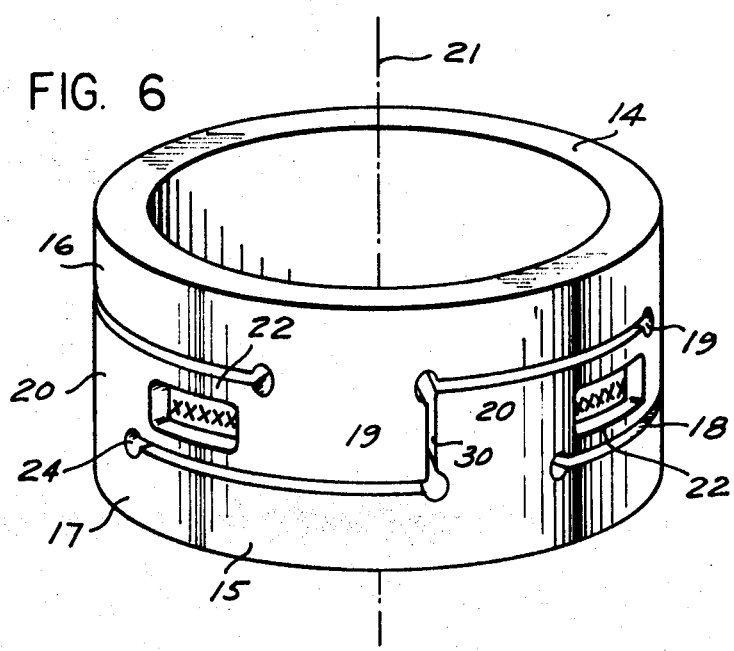
FIG. 8
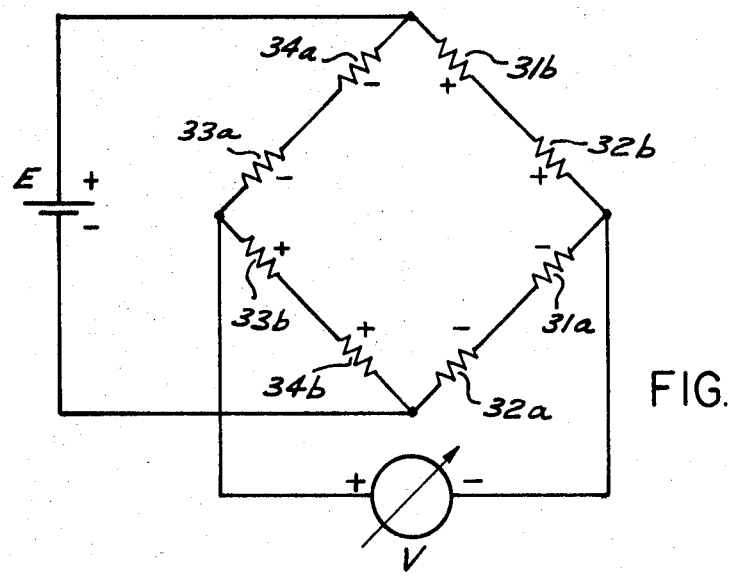
FIG. 9

TUBULAR TRANSDUCER WITH STRAIN GAUGES AND SENSITIVE TO A FORCE TRANSMITTED TO ITS END SURFACES VIA LOAD SURFACES

This invention pertains to transducers, and more particularly to tubular transducers which perform compressive movements under load and include strain gauges to give indications of the magnitude of the load.

An object of the present invention is to obtain a transducer or load cell which can be applied around a fitting extending through the transducer, for instance around a mill screw of a rolling mill so that the transducer then will be able to emit an output proportional to an applied force on the transducer, even if one of the load surfaces which actuates on one of the end surfaces of the transducer is not in parallel with the other load surface. Another object of the invention is to provide a transducer which will be able to permit two mutually movable members to perform the same resilient movement even if a moving force caused by the turning of the non-parallel load surface occurs on the transducer. In order to meet these demands the transducer must not only be arranged to allow a mutually adaptation movement (resilient movement) between both the members, but it must also be able to meet the demand that the resilience essentially will be the same irrespective of where along the peripherical end surfaces of the transducer the non-parallel load surface operates, otherwise the counter force from the transducer will depend on the angular position of the non-parallel load surface, which, for instance, for roll mills would cause the positioned value for the thickness of the milled steel sheets to depend on the said angular position.

In addition to use of the transducer in rolling or roll mills it can also be utilized for propeller thrust measuring at a propeller shaft, for measuring of the tractive force in the wire in a drawing mill, for measuring of forces in squeezing machines, ropes, crane hooks etc. Without insisting that the invention has its largest importance for measuring of pressure of rolling in roll mills the problems concerning these operations will be elucidated by means of FIG. 1 where the rolling pressure for a rolling in progress is controlled by a mill screw 1 which extends through a hole 2 in a mill stand 3. The mill screw is provided with a nut 4 which is applied in a further hole 5 in the mill stand 3. Between the nut 4 and the bottom surface of the hole 5 a transducer 6 is applied so that the mill screw passes through the transducer, which also can be fixed to the mill stand by means of dowels 7. The mutually positions of the not shown rolls are adjusted by rotating either the screw 1 or the nut 4. From FIG. 1 it may be seen that such a rotation will change the pressure on the transducer which can emit an output proportional to the roll pressure in question.

If the transducer placed in the mill stand is very rigid, which is the case in most heretofore known transducers belonging to this category, it can be seen not only that the seat for the transducer (the bottom surface in the hole 5) and the face of the nut opposite the transducer must be exceedingly plane parallel and even but also that the threads of the mill screw and of the nut must be absolutely perfect as well as that the end surfaces of the transducer must be exceedingly parallel and even. Otherwise there is a great risk that the transducer will have a local overloading which during an actuating of the screw and/or the nut will be displaced both tangentially and radially over the end surfaces of the transducer. In this case it should be noted that a normal resilience in known transducers is as small as 0.02 - 0.05 mm at rated load.

In the case where the transducer is dimensioned to withstand a certain overload there is still a great disadvantage because the measuring output emitted from the transducer will depend on the position of the point where the force is applied. Thus means that the transducer will transmit incorrect readings. Moreover, such a transducer must be provided with many strain gauges which are sensitive for the extension of the material. Such strain gauges should be applied both on the internal side and the external side of the transducer if the transducer is supposed to emit a signal which is at least moderately is in accord with the applied forces.

In order to obtain a good bearing and a better force distribution, it was necessary to apply a bearing plate between the transducer 6 and the nut 4. Such a plate is indicated with dashed lines 8 in FIG. 1. However, such a plate must be regarded only as a bearing, which does not give a satisfactory solution of the actual measuring problem. The controlling of the rolling pressure often is carried out during full rolling force when the entire bearing plate has no possibility to perform moves which are necessary for the wanted force distribution.

In the case, for instance, of a transducer according to the U.S. Pat. No. 3.004.231 there are different resilient movements and different counter forces in and from the transducer which cause above mentioned negative results, for instance, in roll mills. On the one hand the present invention solves all above mentioned problems by providing a transducer which has at least three overlap sections which are so located that when one of the load surfaces is not in parallel with the other load surface there is a resilient movement of a magnitude which is essentially independent of where along the end surface in question the point, where the non-parallel load surface causes the largest resilience between first and the second members, is located.

When using the above construction the adaptive movement of the transducer can easily extend to 1 mm. It is very important that the overlap section have the necessary lengths in a transducer which utilizes the present invention so they do not form what can be seen as pure shearing sections, and then the necessary lengths depend on i.a., the lengths of the first and second groups of intermediate parts. A value on the minimum length of the overlap section is that they shall exceed the peripherical length of a widening placed at each slot end, which widening mostly is a through the transducer material, which hole exists i.a. for manufactoring reasons. If the said widening does not exist the length of the overlap section must exceed the breadth of the slot at the slot end that is placed at the overlap section. If the overlap section is made shorter than the above mentioned dimensions, which it has been in the already know embodiments because one eagerly has tried to obtain pure shearing sections, a wholly different transducer with wholly different qualities is obtained, which transducer certainly is suitable for its special field of applications, but which transducer does not in any way solve the above mentioned problems.

On the contrary, the maximum length of the overlap section is resolved by the stiffness in the axial direction which one desires the transducer to have. Even if it were theoretically possible it would hardly in any actual case be practical to make the overlap part longer than ¾ slot length. The most usual values may be between ¼ and ½ slot length. In the case where different lengths are used on the slots the above mentioned values are applicable for the longest slot.

In addition, the transducer according to the invention, because of its construction can be provided with an overload protector in the shape of heads or the like in the slots to further prevent the risk of local overloading of the transducer. A development of the idea of the invention comprises also that condition that the strain gauges are applied on the overlap sections so that they during the application of the load on the transducer are sensitive to deformations in the material caused mainly by shear stresses in the overlap sections, which shear stresses are proportional to the transverse forces in the overlap section but independent of the bending in the same section. By providing an overlap section with material diminishings so that the overlap section, which works as a beam, at least where it carries strain gauges has a cross-section with a large moment of inertia around the symmetry axis of the cross-section compared with the remaining thickness of the material, it is possible to obtain a site for the strain gauges where the deformations caused by the s-earing stresses in the overlap section are pronounced without the risks that the transducer in main is weaken to any appreciable extent. If the overlap section has material diminishings at its middle parts the strain gauges can be placed closer to the point of inflection of the area of bending moments in the overlap section so that the strain gauges are effected with only a small extension by the bending moment. In such a way a transducer can be created,- which, in addition to the fact that it can react to forces to be measured from not pronounced parallel load surfaces, also is considerably sensitive to forces in the measuring direction and rigid and insensitive to forces perpendicular to the measuring direction.

Because the present invention also makes large variations concerning choice of the lengths of the overlap section possible these sections can be dimensioned for the most favorable shearing stress distribution, namely the one which is close to the theoretical. In this way the placing of the strain gauges for obtaining an indication proportional to an applied load is very much facilitated. In order to demonstrate this fact see FIGS. 2 and 3, where FIG. 2 in a vertical view shows a beam 9 comparable with an overlap section, which beam 9 is engaged at in its both end surfaces 10 and 11. The beam is supposed to have a rectangular cross-section A—A, which is located in the middle of the beam between the engaging surfaces 10 and 11 where a couple of forces F—F effects the beam. The shearing stresses caused by the couple of the forces in the cross-section A—A are illustrated in a diagram with a curve 12 in FIG. 3 and as the curve shows the distribution is identical with the theoretical one. In the case where each overlap part is replaced with a pure shearing section an unfavorable distribution is obtained in the section depending on disturbances from the engaging surfaces 10 and 11. A secondary and very serious disadvantage for the transducer as such is that the sensitivity of the transducer will depend on where the force effects along the end surfaces of the transducer, i.e., the shearing stress distribution varies and with that the sensitivity of the transducer. The transducer according to the present invention also solves this problem.

The invention is described below particularly with reference to the accompanying drawings, in which illustrative embodiments of the load cell according to the invention are represented.

FIG. 6 is a perspective view of another embodiment of the transducer according to the invention.

FIG. 8 symbolically shows a transducer with four overlap parts spread in the figure plane.

FIG. 9 is a diagram of the interconnection of the strain gauges on the transducer in a Wheatstone bridge.

Figure 4:
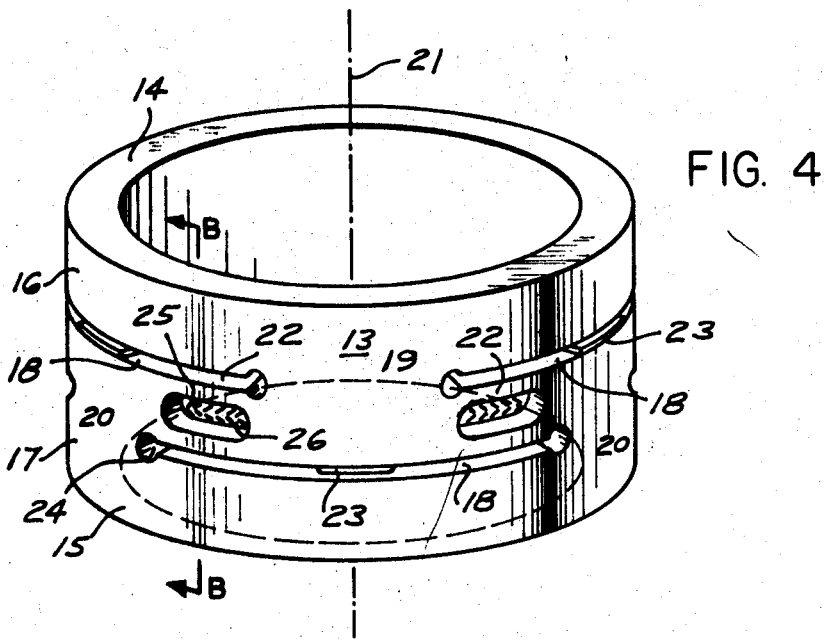
FIG. 4 is a perspective view of the transducer.

In FIG. 4 a transducer is illustrated with 13, whereby the element is tubular and cylindrical. The transducer comprises two end surfaces 14 and 15. To these end surfaces a force is transmitted from load surfaces either directly or indirectly or via applied intermediate means (not shown). One of the end surfaces then can be fixed in a foundation or the like, while the other end surface can be effected in the measuring direction by a movable load part.

One of the end surfaces, for example 14, is located on a first member 16 of the transducer, and the other end surface, i.e., 15, is located on a second member 17, which members 16 and 17 are preferable made rigid against bending. Between the first and the second members slots 18 run through the transducer material for obtaining of two sideways mutually displaced groups intermediate parts 19 and 20. The groups extend essentially in the effectiveness direction, i.e., essentially in parallel with the symmetry axis 21. Then, the group of intermediate parts 19 is joined to the first member 16 and the other group of intermediate parts 20 is joined to the second member 17. Moreover, the group of intermediate parts 19 is joined to the other group of intermediate parts 20 via overlap parts 22, which partly in a known way support strain gauges, and partly work as bending strained beams. Furthermore, the overlap parts 22 have such lengths that the first member 16 and the other member 17 can perform a mutually resilient adaptation movement which eliminates the demand that the load surfaces be absolutely parallel. In the shown example of the embodiment with inside and outside diameters for the transducer of 100 mm and 120 mm and with a length for the intermediate parts 19 and 20 of about 15 mm and with six slots 18 and six overlap parts 22 the suitable length of each overlap part is about 2/5 slot length.

In FIG. 4 an overload protection in the shape of a head in each slot 18 is illustrated at 23. Moreover, at each slot end there is a widening 24 in the shape of a bore hole which extends through the material. The widening also has the function of reducing the moulding effect.

Figure 5:
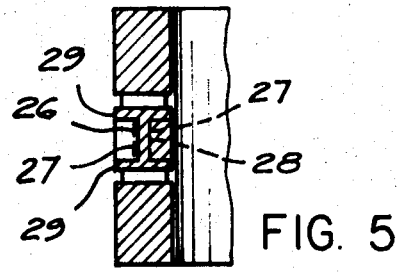
FIG. 5 is a vertical view and a cross-section of the transducer in FIG. 3 along the line B—B.

In order to obtain a transducer which is sensitive in the measuring direction but rigid in other directions the overlap sections are provided with material diminishings 25 where strain gauges 26 are applied. In this way a cross-section in accordance with FIG. 5 is obtained for the overlap section. This cross-section will show a large moment of inertia around its centering axis, which is parallel with the figure plane and perpendicular to the slot parts around the overlap sections 22, in spite of the fact that the remaining material thickness for the surface 27 which carries the strain gauges 26 is small. Thus the said strain gauges can be applied at the neutral axis of the overlap section where the shearing stresses caused by the transverse forces are largest when bendings are present in the overlap part. As FIG. 5 shows by means of a dashed line 28 the material diminishings also can be made from the inside, whereby the overlap section which works as a beam has an essentially I-shaped cross-section where strain gauges can be attached on one of the sides or on both of the sides of the web of the section. The web runs in parallel with the symmetry axis 21 of the tubular transducer and the parts 29 of the overlap section which form the flanges of the I-shaped beam are parallel with the slot parts 18 around the overlap section 22. The material diminishings are performed in the middle of the overlap part and can be made for example by cutting or turning out.

Figure 1:
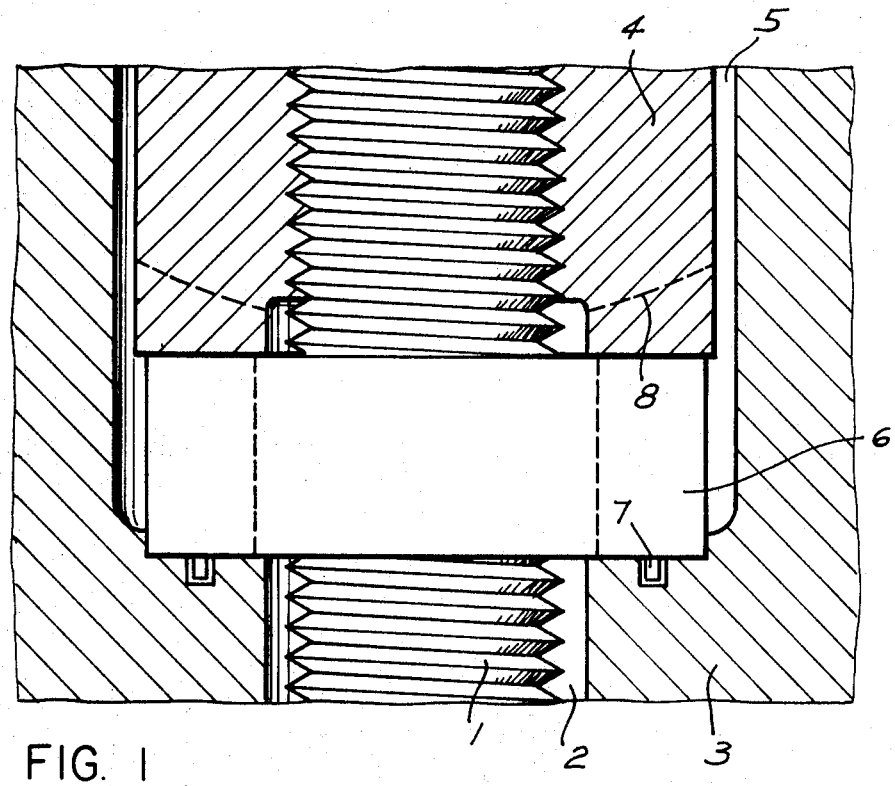
FIG. 1 is a vertical-view of the transducer applied at the mill screw in a mill stand.
Figure 2:
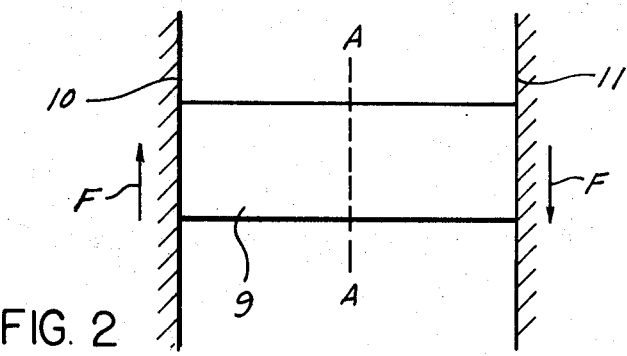
FIG. 2 is a vertical-view of a beam comparable with an overlap section and engaging in its end surfaces.
Figure 3:
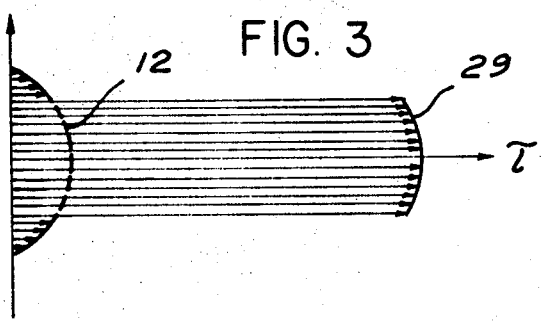
FIG. 3 is a diagram which shows the distribution of the shearing stresses along the cross-section according to A—A in FIG. 1 and B—B in FIG. 4 with and without material diminishings.

FIG. 3 shows the distribution of the shearing stresses in an overlap section along the cross-section in FIG. 5, whereby a curve 29 shows an example of the case where the overlap section is provided with material diminishings so that an I-shaped profile is obtained, while dashed curve 12 shows the case without material diminishings.

Figure 7:
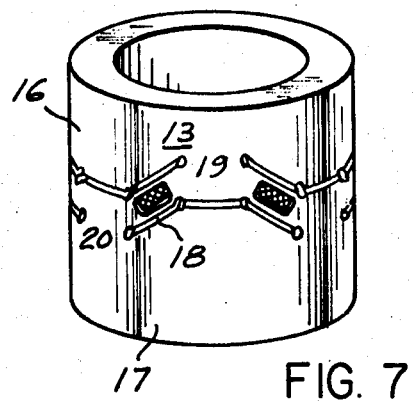
FIG. 7 is a perspective view of an embodiment of the transducer different from the embodiments in FIG. 4 and 6.

In FIG. 4 an example of an embodiment of a transducer with six slots 18 and six overlap section 22 is shown. The invention is not limited to this, but both the number of slots and overlap section can be varied widely, and for example be 4, 8, 12 etc. As the FIG. 6 illustrates the number of overlap section can be reduced in comparison with the number of slots by the fact that these mostly transversal slots 18 at one of their ends are combined with combining slots which run either in parallel with the symmetry axis 21 or with respect to the same axis. In the case where the overlap section does not extend in the peripherical direction it is possible to allow the combining slots run in peripheral direction. Concerning the variation in the directions of the overlap section FIG. 7 shows an example of such variation, which FIG. 7 also illustrates how the slots 18 extend and are performed with bendings.

In order to get a resilient movement which is independent of where along the actual end surface the non-parallel load surface is applied, it is important that there is at least three overlap sections. With respect to the strain gauges, these are applied on the overlap sections so they are effected by the deformations in the transducer material in two directions perpendicular to each other, which both directions also extend along lines 45° to the length axis of the overlap sections. The number of strain gauges on each overlap section is dependent on, among other things, the choice of simple or double strain gauges, and if one places strain gauges only on the outside or the inside, or both on the outside and the inside. The types of the utilized strain gauges are not very important and is mostly dependent on available spots, the size of the transducer, the method of attachment etc.

Without any restrictions for the general reasoning, each overlap section in this example is supposed to have a double strain gauge which is applied on the outside of the overlap section, and, furthermore, it is presumed that the number of the overlap sections is four, whereby the applying of the strain gauges in accordance with FIG. 8 is applicable. FIG. 8 shows a transducer with four overlap sections spread in the figure plane with the above said material diminishings marked reference numerals 31 – 34. A typical strain gauge has two elements 31a and 31b, whereby each element is sensitive to deformations in its own direction. All strain gauge elements are interconnected in a conventional summation coupled Wheatstone bridge as shown in FIG. 9. The bridge is connected across one of its diagonals to a voltage source E and across the other of its diagonals to a voltmeter V. The interconnection of the strain gauge elements shown in FIG. 9 provides that the strain gauges will compensate for the adaptation move between the first member 16 and the second member 17 (FIG. 4) which occurs when the load surfaces are not in parallel in a pronounced way, and then causes a deflection in the voltmeter V proportional to the force applied on the transducer.

If it is supposed that the second member 17 (vide FIG. 4) of the transducer is fixed to a foundation and that the second member 16 of the transducer is effected by a movable load surface which is not in parallel in a pronounced way in comparison with the load surface at the foundation. The transducer is effected at the outer edge of its end surfaces 14, for example, between the overlap sections 32 and 33 (vide arrow F in FIG. 8). Then, the symbolically shown overlap section 32 and 33 essentially will be effected so that the strain gauge elements 32b and 33b have an increase in resistance and the resistance of the strain gauge elements 32a and 33a decreases. This resistance changes in the strain gauge elements are added in the bridge and a voltage proportional to the applied force is obtained in the voltmeter. At the same time the overlap sections 32 and 33 perform a resilient movement directed downwards and, if the force increases still more, the movable load surface will lie close over the whole of the end surface 14 if the force attains a certain level, whereby a resistance change is present in all the strain gauge elements. Also these latter resistance changes are added up in the bridge so that the voltage indication of the voltmeter is proportional to the force all the time. If the parallel derivations between the load surfaces now are changing although the force is of the same value the transducer will perform an adaptation movement, and the resistance changes are redistributed in the bridge, without changing in the output.

It is to be understood that the following claims are intended to cover all of the generic and specific features of the invention herein described, and all statements of the scope of the invention which, as a matter of language, might fall therebetween.

I claim

1. A transducer comprising a hollow tubular body which is symmetrical about its major axis, said body being provided with a plurality of slots extending completely through said body, said slots being intermittently located circumferentially about said hollow tubular body to define first and second members each having an end surface to which can be applied forces, the ends of adjacent slots being axially and circumferentially positioned with respect to each other to define at least three overlap parts which have a length dimension having a component which extends in the direction of said major axis, each of said overlap parts being provided with a cavity such that the overlap part operates as a beam and in cross-section resembles such beam having a web connecting two flanges, so that the cross-section has a relatively large moment of inertia, and strain gauges fixed to the portions of said overlap parts which constitute the web of the beam whereby when load forces are applied to said end surfaces maximum possible shearing stresses are applied to said strain gauges.

2. The transducer of claim 1 wherein the cross-section is an I-beam shaped with the direction of the web substantially parallel said major axis and the flanges are parallel to the portions of said slots adjacent thereto.

3. The transducer of claim 1 wherein said strain gauges are fixed to the portions of said overlap parts which constitute the web so as to be affected by deformations in two orthogonal directions which make 45° angles with the length axis of the associated overlap part.

4. The transducer of claim 3 further comprising a Wheatstone-bridge circuit including said strain gauges so arranged to give an indication only for components of the relative displacement of the end surfaces along said major axis.

5. The transducer of claim 1 wherein the direction of the portion defining the web is substantially parallel to said major axis.

6. the transducer of claim 1 wherein the direction of the portion defining the web is at an angle to said major axis.

7. The transducer of claim 1 wherein the length of each overlap part is less than three-quarters of the length of a slot.

8. The transducer of claim 7 wherein the length of each overlap part is between one-quarter and one-half the length of a slot.

9. The transducer of claim 8 further comprising elements in the body adjacent the slots and extending into the slots to limit the mutual compressive travel of said first and second members to a value which is less than a possible maximum value.

* * * * *